Jan. 15, 1957   H. S. MAGILL   2,777,696
MULTI-PURPOSE CABLE FITTING
Filed April 22, 1955   2 Sheets-Sheet 1
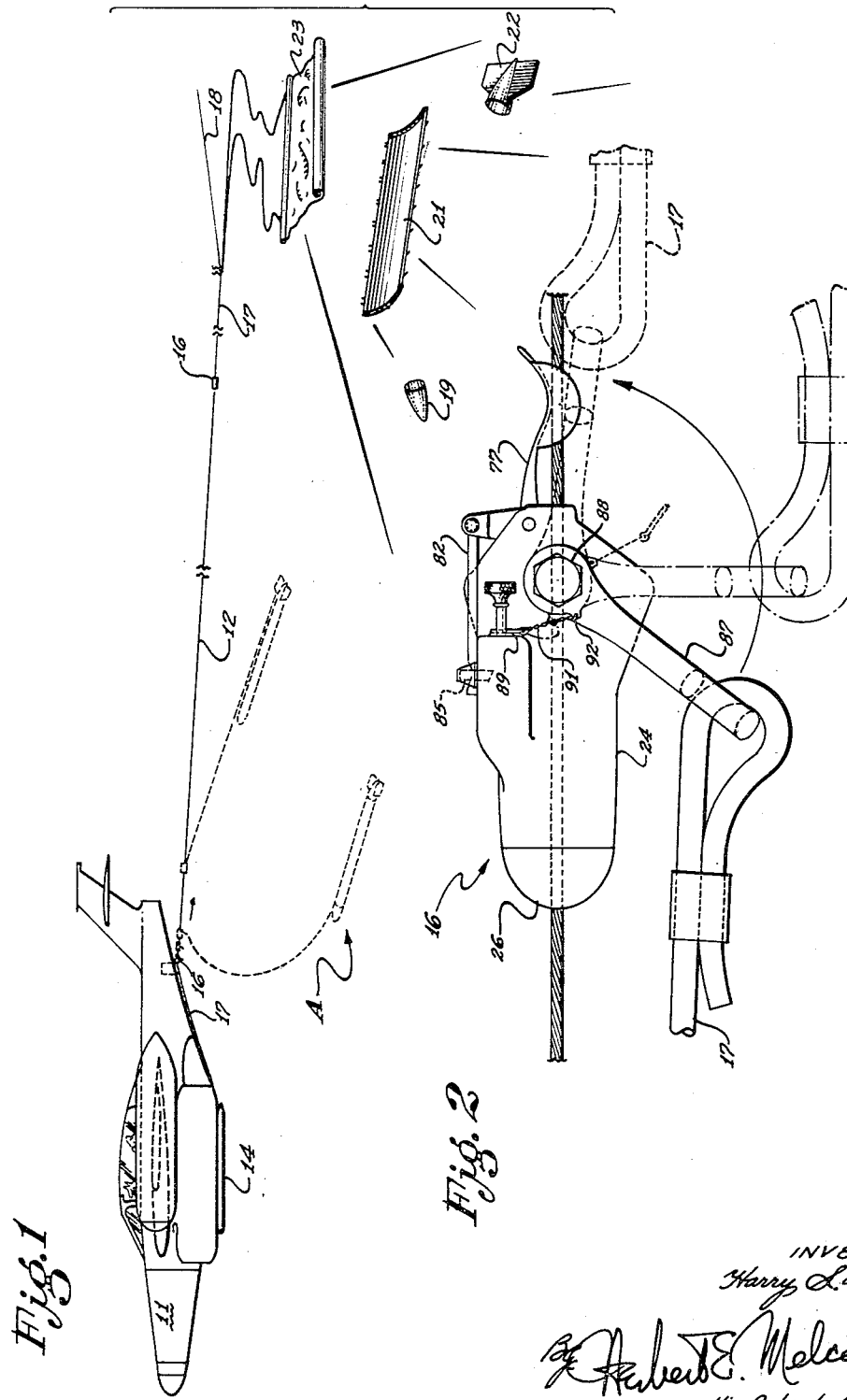
INVENTOR:
Harry L. Magill,
By Herbert E. Metcalf
His Patent Attorney

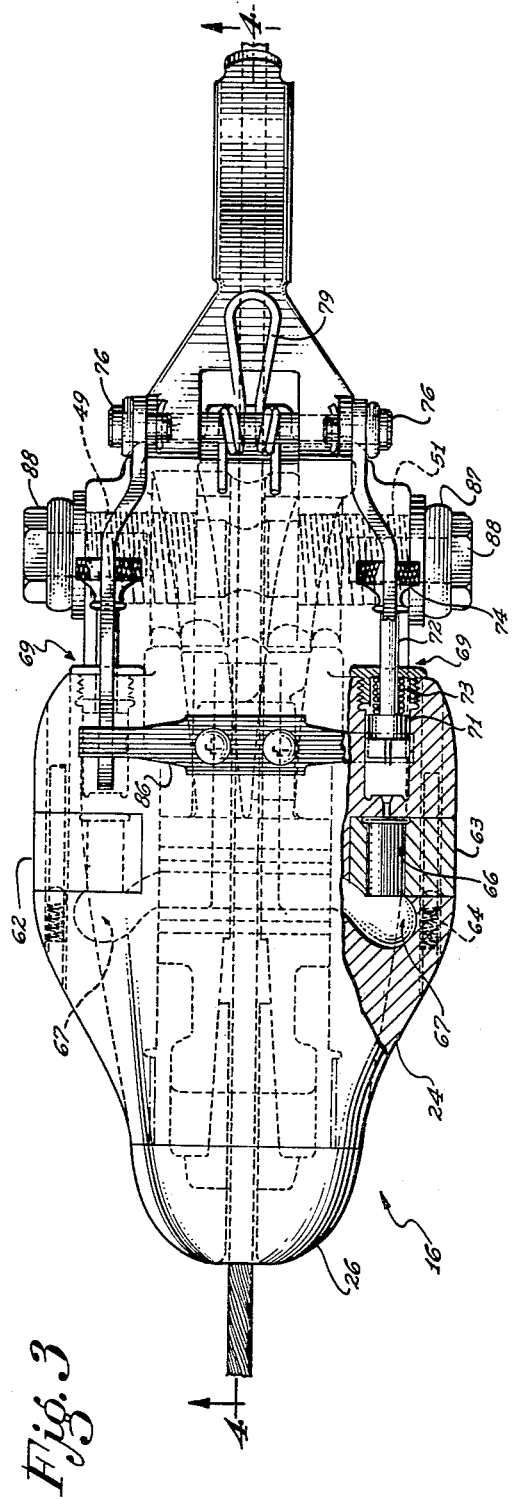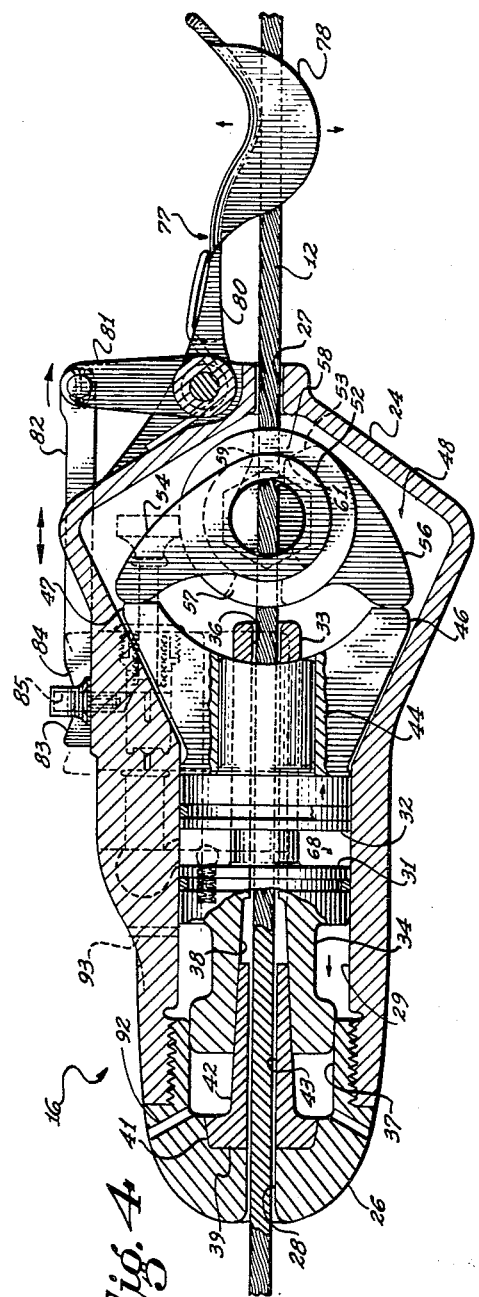

United States Patent Office 2,777,696
Patented Jan. 15, 1957

2,777,696

MULTI-PURPOSE CABLE FITTING

Harry S. Magill, Torrance, Calif., assignor to Northrop Aircraft Inc., Hawthorne, Calif., a corporation of California Application April 22, 1955, Serial No. 503,148

10 Claims. (Cl. 273—105.3)

This invention relates to a cable fitting and more particularly to a multi-purpose cable fitting especially useful in the handling and replacement of targets or the like at the free end of a cable streamed from an aircraft while the latter is airborne.

High performance aircraft are extensively utilized in the towing of military targets thus simulating the flight pattern of an enemy aircraft as nearly as possible. Inasmuch as the flight time of a high performance aircraft is limited, especially when towing a military target or the like, it is extremely important that the original target or a replacement therefor be maintained on the firing range throughout as much of the flying time of the towing aircraft as possible. This is particularly obvious when one considers the fact that, in addition to the towing aircraft, several high performance fighter aircraft and perhaps a coordinating chase plane are also airborne during such an operation, each expending valuable fuel and flying time.

The terms "target" or "aerial target" as used throughout the specification and appended claims refers to a target or the like which is streamed from an aircraft while the latter is in flight.

The present invention discloses novel means enabling and greatly reducing the time required to replace aerial targets as compared with previously known means and techniques. Briefly, the means disclosed herein includes a multi-purpose fitting threaded on a tow cable and having a packaged target shackled thereto. Upon release of the fitting from the towplane it slides aft along the towing cable until it contacts the attached fitting of a previously destroyed target or approaches the free end of a parted cable. In either event an explosive charge is fired and the expanding gasses therefrom result in the fitting permanently attaching itself to the tow cable and simultaneously severing the latter to free the previous fitting or a short length of the tow cable as the case may be. A clearer understanding of the multi-purpose fitting will be forthcoming as the disclosure progresses.

An object of the present invention is to provide a multi-purpose cable fitting making possible the replacement of aerial targets or the like without the towing aircraft losing speed or altitude.

Another object is to provide a multi-purpose cable fitting which greatly reduces the time required to replace an aerial target at the free end of a tow cable as compared with the time required to execute the same operation while using presently known techniques.

Another object is to provide a multi-purpose cable fitting adapted to slide along a cable or the like and permanently attach itself to the cable at such times as the fitting senses certain physical characteristics of the cable or obstructions thereon.

Another object is to provide a multi-purpose cable fitting adapted to slide along a cable or the like and being responsive to certain physical characteristics of the cable whereby the latter will be severed at such time as the fitting senses the aforementioned physical characteristics.

Another object is to provide handling equipment especially adapted for use in replacing an aerial target, which is simple and compact in design and construction, economical to manufacture, and which may be flexibly adapted to the various purposes for which it is intended.

The above and other objects of the invention will manifest themselves more fully together with various uses and advantages thereof as the disclosure progresses.

In the drawings:

Figure 1 is a schematic side view of an airplane from which an aerial target is streamed and embodying the multi-purpose fitting of the present invention.

Figure 2 is a side view of the multi-purpose cable fitting as disclosed herein.

Figure 3 is a top view of the fitting shown in Figure 2 parts thereof being broken away to better show the construction of interior parts.

Figure 4 is a cross sectional view of the fitting shown in Figure 3 taken along the line 4—4 thereof.

Referring to the drawings for a detailed description of a preferred embodiment of the present invention, Figure 1 shows an airborne jet type airplane 11 from which a towing cable 12 is streamed. Attached to the underside of the airplane is a plurality of packaged banner type targets 14 (only one of which is shown). Each of the targets 14 may be released from the airplane 11 by releasing means (not shown) at such times as the pilot desires or conditions warrent. Upon the release of a target it falls away from the airplane and travels rearwardly along the cable 12 supported therefrom by a multi-purpose fitting 16 and lanyard 17. As the fitting 16 approaches the end of the cable 12 it senses certain physical characteristics of the cable resulting in the fitting locking itself to the cable and severing a short portion thereof in a manner which will become obvious as the detailed description progresses.

As the target reaches the free end of the cable 12 and is permanently attached thereto its inertia places a load on a leader 18 causing the package indicated by the numerals 19, 21, and 22 to separate. Subsequently the target 23 unfurls and streams itself aft of the cable 12 in a towing attitude. Inasmuch as the package containing the target 23 and the manner in which the latter is opened constitutes no part of the present invention it will not be described further.

The fitting 16 comprises an elongated shell like housing 24 and nose cap 26 threadably secured in one end of the housing. Located in the end of the housing 24, opposite the nose cap 26 and also in the nose cap itself are axially aligned apertures 27 and 28, respectively, allowing the cable 12 to pass freely therethrough. Located in a cylindrical bore 29 are a pair of pistons 31 and 32 each provided with suitable sealing means. The piston 31 is provided with a first cylindrical shank portion 33 providing a bearing and guiding surface for the piston 32. The piston 31 is also provided with a second cylindrical shank portion extending therefrom on the side opposite the shank 33. The piston 31 has a bore 36 extending throughout its length in axial alignment with the bores 27 and 28 and also of a diameter allowing the cable 12 to pass freely therethrough. The outer end of the shank 34 is of cylindrical configuration to provide a sliding relationship with a counterbore 37 formed in the inner end of the cap 26. A tapered counterbore 38, diminishing in diameter in a direction toward the piston 31, extends inwardly from the outer end of shank 34. A swaging member 39 is positioned between the shank 34 and cap 26 in a counterbore 41 formed in the latter and is provided with a tapered sleeve 42 extending in part within the counterbore 38.

The member 39 is provided with an axial bore 43 normally allowing the cable 12 to freely pass therethrough. The member 39 may be constructed of a soft alloy material such as lead, a lead zinc alloy, soft copper, etc. From the above description it will be obvious that the member 39 will be permanently deformed and secured to the cable 12 at such time as the piston 31 is moved sufficiently in the direction of cap 26.

The piston 32 is also provided with a shank portion 44 surrounding the shank 33 and having a sliding relationship therewith and terminating in arms 46 and 47. These arms are located at approximately diametrically opposite positions with respect to the axis of the piston 32 and terminates in a cavity 48 formed in the end of the housing opposite the cap 26.

A pair of axially aligned stub shafts 49 and 51 threadably engage wall portions of the housing 24 and extend into the cavity 48 a predetermined distance to provide a bearing for a pair of cable cutters 52 and 53. The cutter 52 is pivotally mounted on the adjacent end portions of the shafts 49 and 51 while the outer surface of the cutter 52 provides a pivotal bearing surface for the cutter 53. The cutters 52 and 53 are provided with radially extending arms 54 and 56, respectively, and in the assembled position thereof the outer end portions of the arms 54 and 56 contact the ends of arms 47 and 46, respectively. Also at this time aligned apertures or passageways 57 and 58 provide a passageway for the cable 12 to pass freely through the cutters 52 and 53 as best seen in Figure 4. The cutters so arranged will sever the cable 12 at their cutting edges 59 and 61 at such times as the piston 32 is moved sufficiently in a direction away from the cap 26.

Formed in wall portions of the housing 24, and located on opposite sides of the bore 29, are breach blocks 62 and 63. These blocks are pivotally mounted for movement between loading and firing positions and are held in the latter positions by means of detents 64. In the closed positions of the breach blocks cartridge chambers 66 formed therein communicate with respective collecting chambers 67 which in turn communicate with the expansion chamber 68 defined by the bore 29 and the pistons 31 and 32.

Located at the ends of the chambers 66, opposite the collecting chambers 67, are a pair of firing pin assemblies 69. Each of these assemblies consists of a firing pin 71, stem 72, and spring 73 as best seen in Figure 3. The stems 72 extend from the housing 24 and are provided with knurled knobs 74 on their extending ends. The knobs provide means for cocking the assemblies 69 and the stem provides means for safetying the assemblies in a manner presently explained.

Pivotally mounted on the end of the housing opposite the cap 26, as by means of a pair of pins 76, is a bell crank type trigger 77. A lip like portion 78 formed on the arm 80 of the trigger 77 embraces the cable 12 and is continuously urged into contacting relation therewith by means of a spring 79. The arms 81 of the trigger 77 are pivotally attached to respective actuating cams 82 the end portions of which, removed from the arms 81, are slidably mounted on the housing 24. The slidably mounted ends of the actuating cams 82 are provided with camming surfaces 83 and 84 cooperating with pins 85 which release the firing pins 71 at such times as the trigger arm 80 is moved a sufficient distance in either a clockwise or counter clockwise direction from its position as shown in Figure 4. A leaf spring 86 continuously urges the pins 85 in a direction toward the axis of the firing pin assemblies 69.

The ends of a yoke 87 embrace the fitting 16 and are pivotally attached thereto by means of a pair of studs 88 allowing movement of the yoke through a predetermined range, as best seen in Figure 2. One end of the lanyard 17 is attached to the yoke 87 and its other end to a respective target 14. Prior to the release of a particular target 14 the yoke 87 attached thereto assumes a safety position as shown by solid construction in Figure 2. In the cocked position of the assembly 69 a key 89 extends through an aperture in the stem 72 to effectively retain the assembly 69 in its cocked position until withdrawn. A chain 91 or the like extends between a lug 92 formed on the yoke 87 and the key 89. As the yoke 87 is pivoted in a counter clockwise direction, as viewed in Figure 2, it is obvious the key 89 will be withdrawn from the aperture in the stem 72 and the pin 71 will be free to move forward at such time as the pin 85 is removed from its forward path.

The component parts of the fitting 16 and their relationships having been described a clearer understanding as to their function will be forthcoming from the following description of a target streaming operation.

First it is assumed that a target 23 has become damaged by rockets or gun fire and is no longer servicible for the purpose intended and must be replaced. Under such conditions a packaged target 14 is released by the pilot of the plane 11. The target 14 falls away from the plane 11 and pulls the fitting 16 along with it. As the target 14 reaches a position A, as shown in Figure 1, the yoke 87 is pivoted from its safety position to a non-safety position thereby withdrawing the key 89 from the stem 72 and arming the firing assembly 69.

At such time as the fitting 16 reaches the end of cable 12 the portion 78 of the arm 80 rides up over the fitting 16 of the destroyed target thereby firing explosive cartridges, not shown, but which would be contained in the chambers 66. Gas from the cartridges flows to the chamber 68 where it expands. Accordingly the piston 32 is moved aft actuating the cutters 52 and 53 causing them to sever the cable 12 and thus free the destroyed target. Simultaneously the piston 31 is moved forward forcing the shank 34 further over the soft alloy sleeve 42 thereby locking the sleeve and fitting 16 securely to the cable 12.

Assume now that the cable 12 has been parted by rockets or gun fire and a new target must be placed on the cable 12. In this event there will not be a fitting 16 on the cable 12 to contact the portion 78 of the arm 80. Under these conditions the spring 79 will overpower the stiffness of the cable 12 as the fitting 16 nears the end of the cable and acts to bend the latter out of line. Inasmuch as the pins 85 will be removed from the forward path of the firing pins 71 by this movement of the arm 80 explosive cartridges when positioned in the chambers 66 will be fired, the cable 12 will be severed, and the members 39 and fitting 16 locked on the cable 12 in the manner as described above.

Pressure relief ports 92 and 93 are provided in the cap 26 and housing 24, respectively. The port 93 is positioned in the wall of the housing 24 so that, when the swaging operation is complete, the high pressure gas in the expansion chamber 68 is exhausted to the atmosphere.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A fitting of the class described, comprising: a housing having a cavity therein and opposed end walls; a first piston operationally mounted in said cavity; a deformable member mounted in said cavity between said piston and one of said end walls and being permanently reshaped in response to predetermined movements of said piston; portions of said end walls, piston, and member defining respective aligned apertures through which a cable may be threaded; portions of said housing defining at least one cartridge receiving chamber in fluid communication with said cavity at a position between said piston and the other one of said end walls; a firing pin assembly mounted in said housing adapted to fire a cartridge positioned in said chamber; trigger means mounted on said housing and having neutral and non-neutral positions; said assembly normally being responsive to movements of said trigger means in that said cartridge will be fired at such times as said trigger means is moved from neutral to a non-neutral position.

2. Apparatus as set forth in claim 1: further characterized in that said member includes a sleeve portion and said piston a shank portion the latter having a tapered counterbore the walls of which surround said sleeve and effect a reduction in the cross-sectional area of the aperture therein as a result of said predetermined movements of said piston.

3. Apparatus as set forth in claim 2: further characterized by including pivotal means mounted on said housing and having a plurality of safety positions rendering said firing pin assembly non-responsive to movements of said trigger means and a plurality of non-safety positions in which said firing pin assembly is responsive to movements of said trigger means.

4. Apparatus as set forth in claim 2: further characterized in that said trigger means includes an arm adapted to ride on a cable when threaded through said apertures and being resiliently urged against said cable whereby said arm will sense certain physical characteristics of said cable and thereby be moved from said neutral to one of said non-neutral positions.

5. Apparatus as set forth in claim 2: further characterized in that the axes of said apertures and the axis of said piston are in co-axial alignment.

6. A fitting of the class described, comprising: a housing having a cavity therein and opposed end walls; first and second pistons operationally mounted in spaced axial aligned relation in said cavity; a deformable member mounted in said cavity between said first piston and the adjacent one of said end walls and being permanently reshaped in response to predetermined movements of said first piston; a cable cutter assembly mounted in said cavity between said second piston and the adjacent one of said end walls and being actuated between open and closed positions in response to predetermined movements of said second piston; portions of said end walls, pistons, member, and cutter assembly, when the latter is in said open position, defining respective aligned apertures through which a cable may be threaded; portions of said housing defining at least one cartridge receiving chamber in fluid communication with said cavity at a position between said first and second pistons; a firing pin assembly mounted in said housing adapted to fire a cartridge positioned in said chamber; trigger means mounted on said housing and having neutral and non-neutral positions; said assembly normally being responsive to movements of said trigger means in that said cartridge will be fired at such times as said trigger means is moved from neutral to non-neutral positions.

7. Apparatus as set forth in claim 6: further characterized in that a portion of said cavity constitutes a cylindrical bore and the apertures in said end walls, pistons, member and cutter assembly are co-axially aligned with said cylindrical bore.

8. Apparatus as set forth in claim 7: further characterized in that said member includes a sleeve portion and said first piston a shank portion the latter having a tapered counterbore the walls of which surround said sleeve and effect a reduction in the cross-sectional area of the aperture therein as a result of said predetermined movement of said first piston.

9. Apparatus as set forth in claim 7: further characterized in that said second piston has a pair of arms attached thereto adapted to contact said cutter assembly to move the latter from said open to said closed position as a result of said predetermined movements of said second piston.

10. Apparatus as set forth in claim 7: further characterized in that said trigger means includes an arm adapted to ride along a cable when threaded through said apertures and being resiliently urged against said cable whereby said arm will sense physical characteristics of said cable and thereby be moved from said neutral to one of said non-neutral positions.

References Cited in the file of this patent

UNITED STATES PATENTS

| 2,489,632 | Frieder | Nov. 29, 1949 |
| 2,567,170 | Aiken | Sept. 11, 1951 |